(12) United States Patent
Riess et al.

(10) Patent No.: US 6,484,066 B1
(45) Date of Patent: Nov. 19, 2002

(54) IMAGE LIFE TUNNEL SCANNER INSPECTION SYSTEM USING EXTENDED DEPTH OF FIELD TECHNOLOGY

(75) Inventors: Michael J. Riess, Chenango Forks, NY (US); Lawrence E. Albertelli, Owego, NY (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/694,195

(22) Filed: Oct. 23, 2000

Related U.S. Application Data
(60) Provisional application No. 60/162,622, filed on Oct. 29, 1999.

(51) Int. Cl.[7] .......................... G06F 7/00; B65G 43/00; B65G 47/00; G01B 11/00
(52) U.S. Cl. ........................ 700/217; 700/218; 356/602; 198/502.2
(58) Field of Search .................................. 700/217, 218; 356/602, 613, 634; 198/502.2, 502.3

(56) References Cited

U.S. PATENT DOCUMENTS

| | | | |
|---|---|---|---|
| 5,249,035 A | | 9/1993 | Yamanaka |
| 5,543,103 A | | 8/1996 | Hogan |
| 5,815,274 A | * | 9/1998 | Dlugos ................... 356/634 X |
| 5,838,573 A | | 11/1998 | Crathern |
| 5,841,541 A | * | 11/1998 | Dlugos ................... 356/602 X |
| 5,852,672 A | | 12/1998 | Lu |
| 5,864,640 A | | 1/1999 | Miramonti |
| 5,877,963 A | | 3/1999 | Leung |
| 5,991,041 A | * | 11/1999 | Woodworth ............ 356/634 X |
| 6,064,629 A | * | 5/2000 | Stringer et al. ............. 367/128 |
| 6,133,948 A | * | 10/2000 | Abbott et al. ............ 382/162 X |
| 6,137,577 A | * | 10/2000 | Woodworth ............ 356/623 X |
| 6,209,711 B1 | * | 4/2001 | Koopmann et al. .. 198/502.2 X |
| 6,273,240 B1 | * | 8/2001 | Mount ................. 198/502.2 X |

* cited by examiner

Primary Examiner—Joseph E. Valenza
Assistant Examiner—Gene O Crawford
(74) Attorney, Agent, or Firm—Perkins, Smith & Cohen LLP; Harvey Kaye; Jacob N. Erlich (57) ABSTRACT

An image lift tunnel scanner uses extended depth of field cameras in order to view objects of various shapes and sizes on a conveyor system. The image lift tunnel scanner operates by passing a package first through a dimensioning device, such light curtain that determines the package's height, width, length, orientation and position on the conveyor belt. A bottom scan camera takes a fixed focus image and requires only a trigger and length information from the light curtain. The length information determines the duration of the scan after the camera receives the trigger signal. A top scan camera also requires a trigger and the length information along with the height information so that it can set its focus. Each of two side cameras also receives trigger and length information. If the package is registered on the conveyor belt, the only additional information required is the package width and the package position on the conveyor belt so that the start and stop of the image scan can be calculated. A first side camera scans the front of the package as the package approaches the camera. The first side camera views the front side of the package at a 45 degree angle. After sweeping the front of the package, the scan line of the first side camera continues sweeping along the side of the package, again at a 45 degree angle, but shifted 90 degrees relative to the angle at which the front side of the package was scanned. A second camera views the back and the other side of the package.

9 Claims, 10 Drawing Sheets

IMAGE LIFE TUNNEL SCANNER INSPECTION SYSTEM USING EXTENDED DEPTH OF FIELD TECHNOLOGY

CROSS-REFERENCE TO RELATED APPLICATIONS

The present application is based upon U.S. Provisional Application Ser. No. 60/162,622 filed Oct. 29, 1999.

FIELD OF THE INVENTION

This invention relates generally to the conveying and sorting art and, more particularly, to the imaging of all sides of an object on a conveyor belt as the object passes by a camera for further processing of the object, such as reading an address label.

BACKGROUND OF THE INVENTION

Machine vision can replace human vision for a variety of tasks such as inspection and target tracking and can do a better job than human vision when precise information must be quickly and/or repetitively extracted from an image. An example of a task where machine vision inspection is needed is package handling for a package delivery service. A delivery service such as the U.S. Postal Service typically handles millions of items each year. Package handling requires some automation, such as using machine vision to read addresses, a necessity in order to deliver all the items to their proper destinations quickly.

Machine vision inspection of moving objects can be accomplished using a line scan camera. A line scan camera has a linear array of photosensors and can generate a two-dimensional image of an object as the object moves past the camera.

U.S. Pat. No. 5,249,035 discloses a method of measuring three dimensional shape objects using multiple cameras to gather images.

U.S. Pat. No. 5,543,103 discloses a process of surface shaping by creating a three dimensional depiction of an object and then incorporating a selected portion as an integral part of a wall surface.

U.S. Pat. No. 5,852,672 discloses an image system for three dimensional, 360 degree, time sequence surface mapping of moving objects.

U.S. Pat. No. 5,877,963 discloses an intelligent document recognition and handling arrangement for analyzing an image and comparing it to a data base of previously acquired images.

U.S. Pat. No. 5,864,640 discloses a method and apparatus for optically scanning three dimensional objects using color information in trackable patches and is concerned with using color information from a series of two dimensional color images to derive a three dimensional location in space of the surface points which produced the color images.

U.S. Pat. No. 5,838,573 discloses a process and apparatus for spotting labels using a camera for each side of an object and the images are used for the determination of the coordinates so that wraps on one conveyor may be mated with the containers which are located on another conveyor.

One problem presented in automatic inspection systems is the inability to image all sides of a package on a conveyor belt as the package passes by a camera. The top and bottom of the package can be imaged using current technology. The two sides of the package parallel to the direction of travel may also be imaged using current technology if the package is oriented squarely on the conveyor belt. Using a line scan camera, however, which is the economical method of imaging moving objects on a conveyor system, it is very difficult to obtain a high quality of image of those sides of the package that change their distance from the camera as the package passes through the camera viewing area. In the case of a package that is registered squarely on the conveyor belt, the leading and trailing sides would significantly change focal distance of the camera's scan line as it sweeps across the surface. It is even more difficult with an unregistered (i.e. skewed) package because none of the four vertical sides of the package maintain a constant focal distance as the package passes by the camera.

A device that is currently used in industry is a bar code reader tunnel scanner. This device will read bar codes on any side of a package on a conveyor belt as the package passes by the camera. A bar code reader, however, only examines the pulse stream of a reflected laser beam and looks for the specific pulse pattern produced when the beam sweeps over a bar code. It is not possible to use this information to build an image of the surface being viewed that is of adequate quality for an optical character recognition (OCR) process.

The shortcomings of current imaging technology require either a manual operation that orients the package so that the camera views the side of interest, or a complicated mechanism that reorients the package until all the sides have been scanned. The manual operation is slow and has variable reliability and added expense of human intervention. The reorientation mechanism is a more consistent capital expense than the manual operation, but is complicated due to the range of size, weight, shape and texture of the packages in the mail stream, which it must be capable processing.

SUMMARY OF THE INVENTION

It is an object of the present invention to provide a way of imaging all sides of the package quickly and accurately.

It is another object of the present invention to provide a method and system capable of acquiring images from all visible exterior surfaces of an object, for example, in a machine vision inspection operation.

It is a further object of the present invention to provide a method and system which is capable of incorporating therein extended depth of field technology during machine vision inspection.

These objects as well as others objects and advantages of the present invention are achieved by the embodiments of the invention.

The present invention uses cameras with extended depths of field to view objects angularly so that at least two sides of a six sided box, for example, can be viewed by a single camera, and in some cases three sides may be scanned by a single camera. For example, the top and a side may be scanned simultaneously with the near and far portions of each surface remaining in focus. In this case the camera scans a line from the bottom of a side to the top of the side and then bends over onto the top of the box and extends to the far edge on the top of the box.

Typically there are scan of 200 of these lines for every inch that the box moves past the camera on the conveyer. The result of placing these scanned lines side by side is an image of two sides of the box with every portion of each surface being in focus. Alternatively the front and then the side would be scanned with vertical scan lines as the box moved past the camera. Thus, "tunnel scanning" may be used to collect images for various purposes, such as, for an OCR system. A conventional camera would have to continually change focus, as the parcel passes the camera on a conveyor in order to capture an image of the front of the box as it approached or of the back of the box as it moved away from the camera. If the box is not aligned to the camera's line of sight, then even refocusing would not allow the entire scan line to be in focus.

The tunnel scanning system, using the extended depth of field technology can provide images of all six sides of a box on a conveyor passing a camera with as few as two line scanning cameras, each collecting images of three sides of the box.

An extended depth of field imaging system is used in an image lift tunnel scanner capable of simultaneously focusing on objects of different heights. A typical optical system, in inspection applications, has a limited depth of focus of about +/−1 inch, and must adjust its focus to view objects of more widely varying heights separately. The extended depth of field imaging system is capable of simultaneously viewing packages that have as much as a 30 inch height differential. The application places a camera above the conveyor belt, where the camera scans a mixed stream of non-singulated packages. Short and tall packages that are side by side are scanned with the same focal quality.

The image lift tunnel scanner operates by passing a package first through a dimensioning device, such as light curtain, that determines the package's height, width, length, orientation and position on the conveyor belt. A bottom scan camera takes a fixed focus image and requires only a trigger and length information from the light curtain. The length information determines the duration of the scan after the camera receives the trigger signal. A top scan camera also requires a trigger and the length information along with the height information so that it can set its focus. Each of two side cameras also receives trigger and length information. If the package is registered on the conveyor belt, the only additional information required is the package width and the package position on the conveyor belt so that the start and stop of the image scan can be calculated. A first side camera scans the front of the package as the package approaches the camera. The first side camera views the front side of the package at a 45 degree angle. After sweeping the front of the package, the scan line of the first side camera continues sweeping along the side of the package, again at a 45 degree angle, but shifted 90 degrees relative to the angle at which the front side of the package was scanned. Due to the extended depth of focus capability, the system has only to track the start and stop times of the scan. The task of tracking the surface in real time and refocusing the system is not necessary. The second camera scans the side of the package and the back of the package as the package moves along the conveyor belt.

In a second mode of the invention, the package is unregistered (skewed) on the conveyor belt. The unregistered package configuration uses an additional mirror element for each side viewing camera. The mirror is servo controlled and moves based upon the package orientation information received from the light curtain system. The servo mirror system maintains a 45 degree incident scanning angle for each side camera regardless of the package orientation. Each side camera is capable of scanning the front and then a first side of a package or a second side of the package and then the back of the package. The control system must ensure that the two side cameras do not duplicate the scanning of one side while omitting the scan of the opposite side.

Additionally, there is an optimal orientation range for each side camera. Only the sides of the package that are angled towards the side of the belt where the camera is located are viewed by that camera. This is due to the fact that the viewing distance increases significantly when the required 45 degree angle is maintained as the side increases in angle away from the camera. A registered package is considered to have its front side at 90 degrees relative to the side of the conveyor and the right side at 0 degrees relative to the side of the conveyor. Only packages with the front side orientations from 45 degrees will have the front side imaged by the camera on the first side. Otherwise, when the front side is oriented at more than 45 degrees, the camera on the second side will capture the front side image and the first camera will captures the back side image of the package.

The extended depth of field creates a tunnel scanning system that is more robust than the dynamic focus system of the prior system. Moreover, there are no moving parts in the focusing mechanism, that are no timing dependencies which could affect image quality and the system is capable of scanning irregular surfaces.

The present invention together with the above and other advantages may best be understood from the following detailed description of the embodiments of the invention illustrated in the drawings.

DETAILED DESCRIPTION OF PREFERRED EMBODIMENTS

Figure 8:
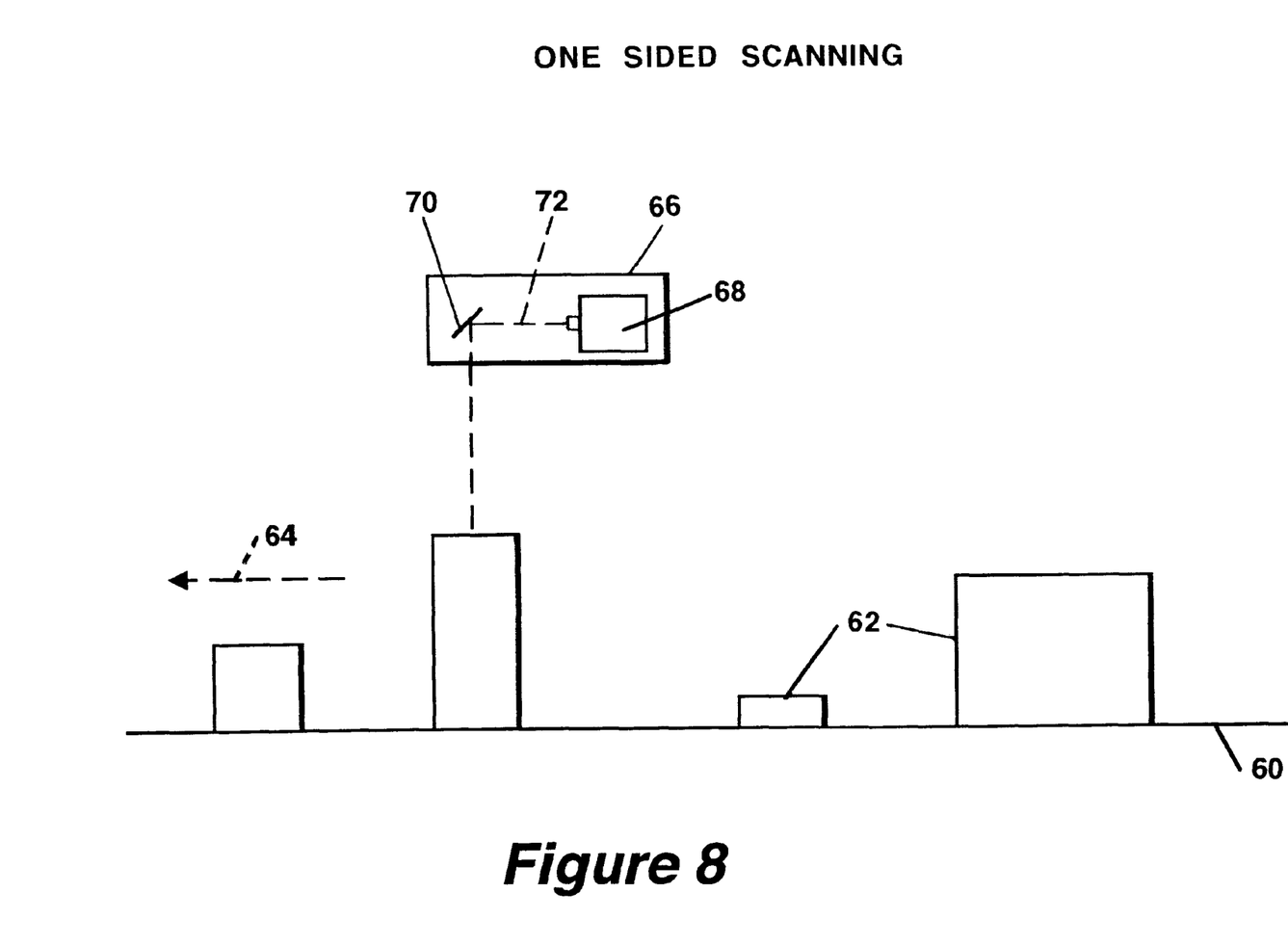
FIG. 8 is a schematic view showing one sided scanning.

FIG. 8 is a schematic view showing one sided scanning in which a conveyor 60 is moving articles 62 of various size in direction 64. A scanner 66 which includes a camera 68 and a mirror 70 scans the tops of the different size articles 62 by having a field of view which is above but parallel to the conveyor 60 and the mirror 70 directs the line of sight 72 onto the tops of the articles by reflection from the mirror 70. From this it can be seen that a fixed focus camera will need a large depth of field in order to properly scan the tops of the articles 62.

Figure 9:
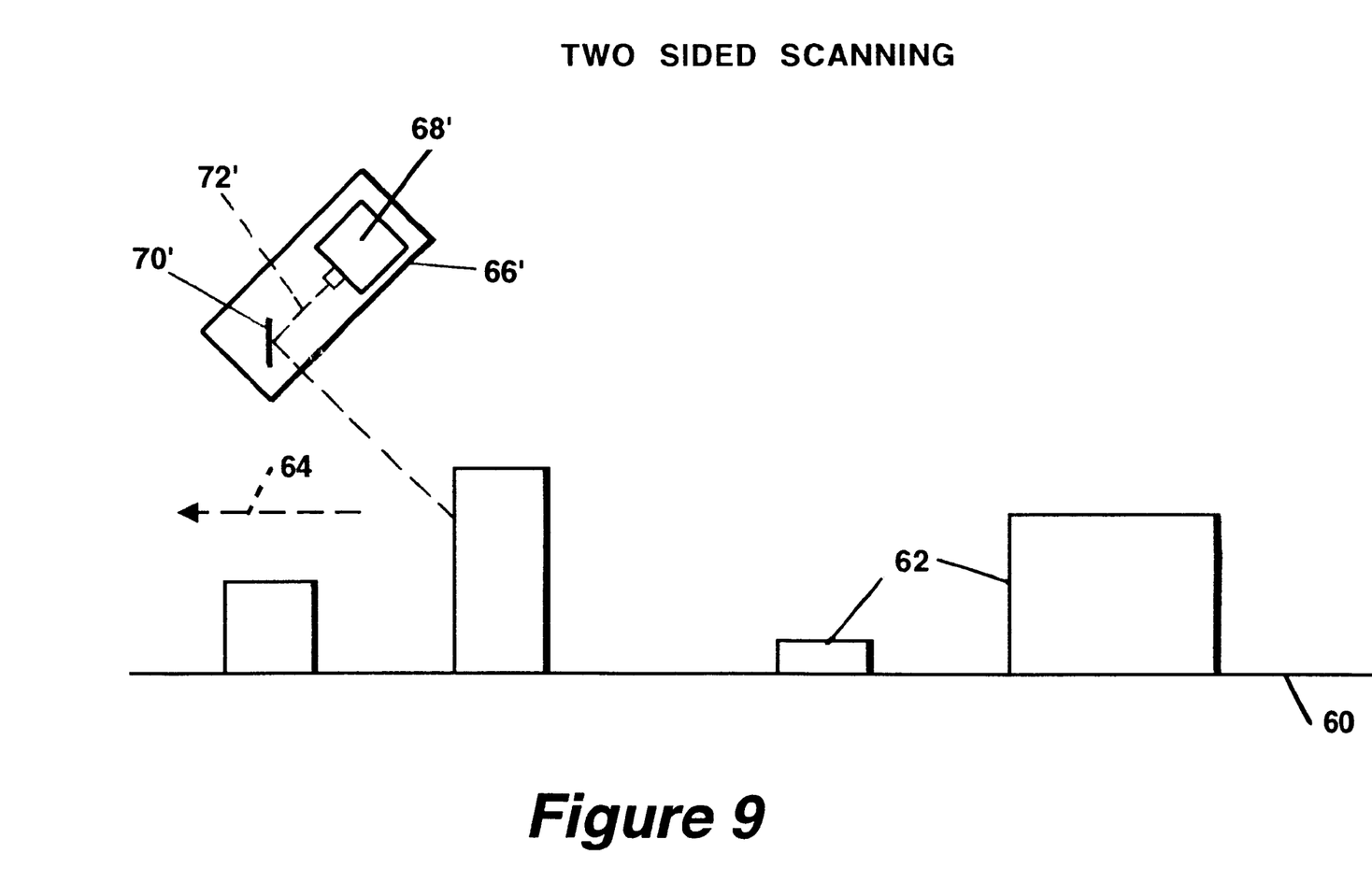
FIG. 9 is a schematic view showing two sided scanning.

FIG. 9 is a schematic view which also shows two sided scanning in which a conveyor 60 is moving articles 62 of various size in direction 64. In this arrangement the scanner 66' having a camera 68' and a mirror 70' has a field of view directed downwardly at an angle to the conveyor, and the mirror 70' directs the lilne of sight 72', via mirror 70' onto first front sides of the articles and then the tops of the articles 62.

Figure 1:
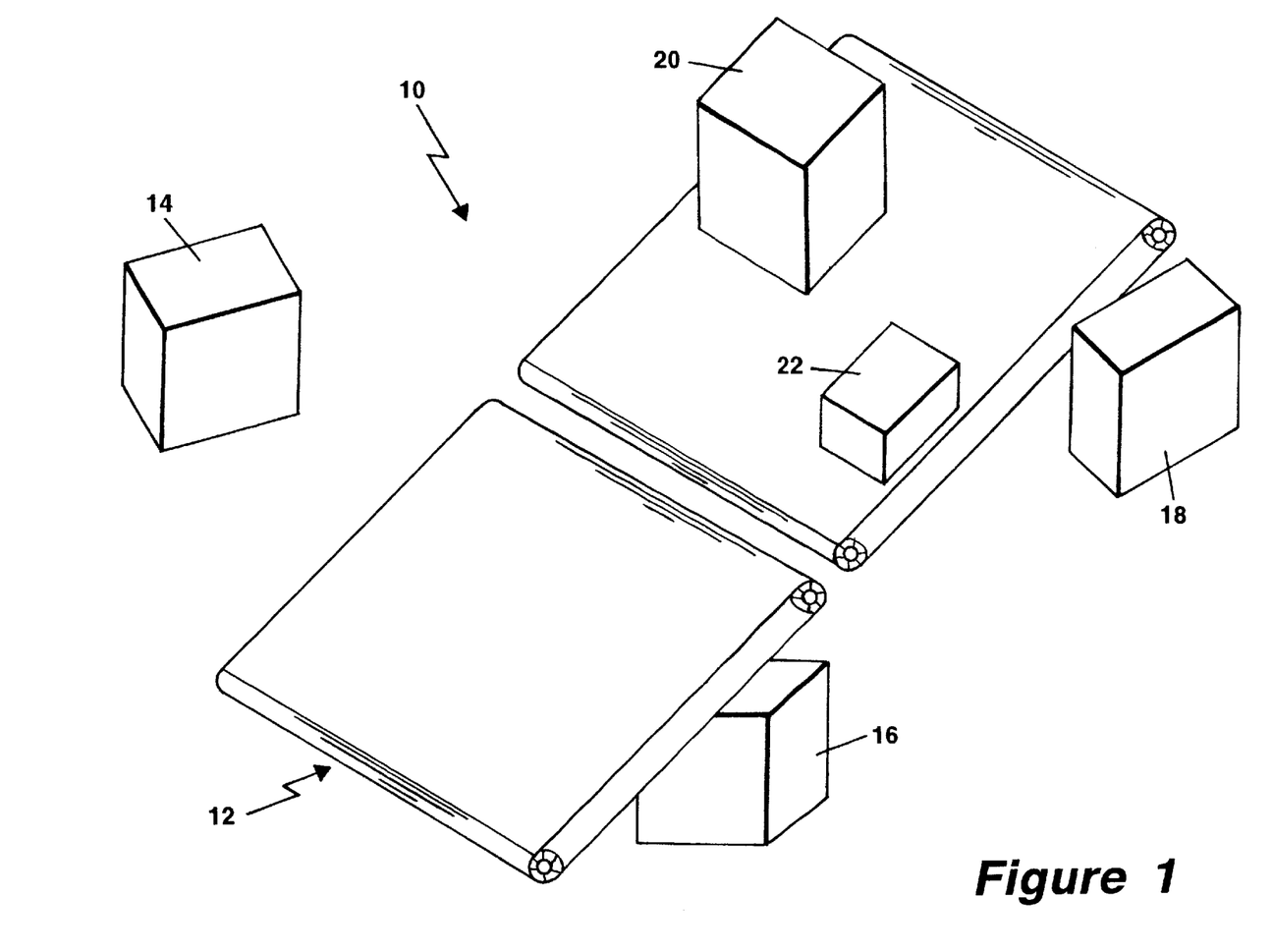
FIG. 1 is a schematic isometric view of a machine vision inspection system utilizing a conveyor belt and camera placement according to a preferred embodiment of the invention for registered packages.
Figure 2:
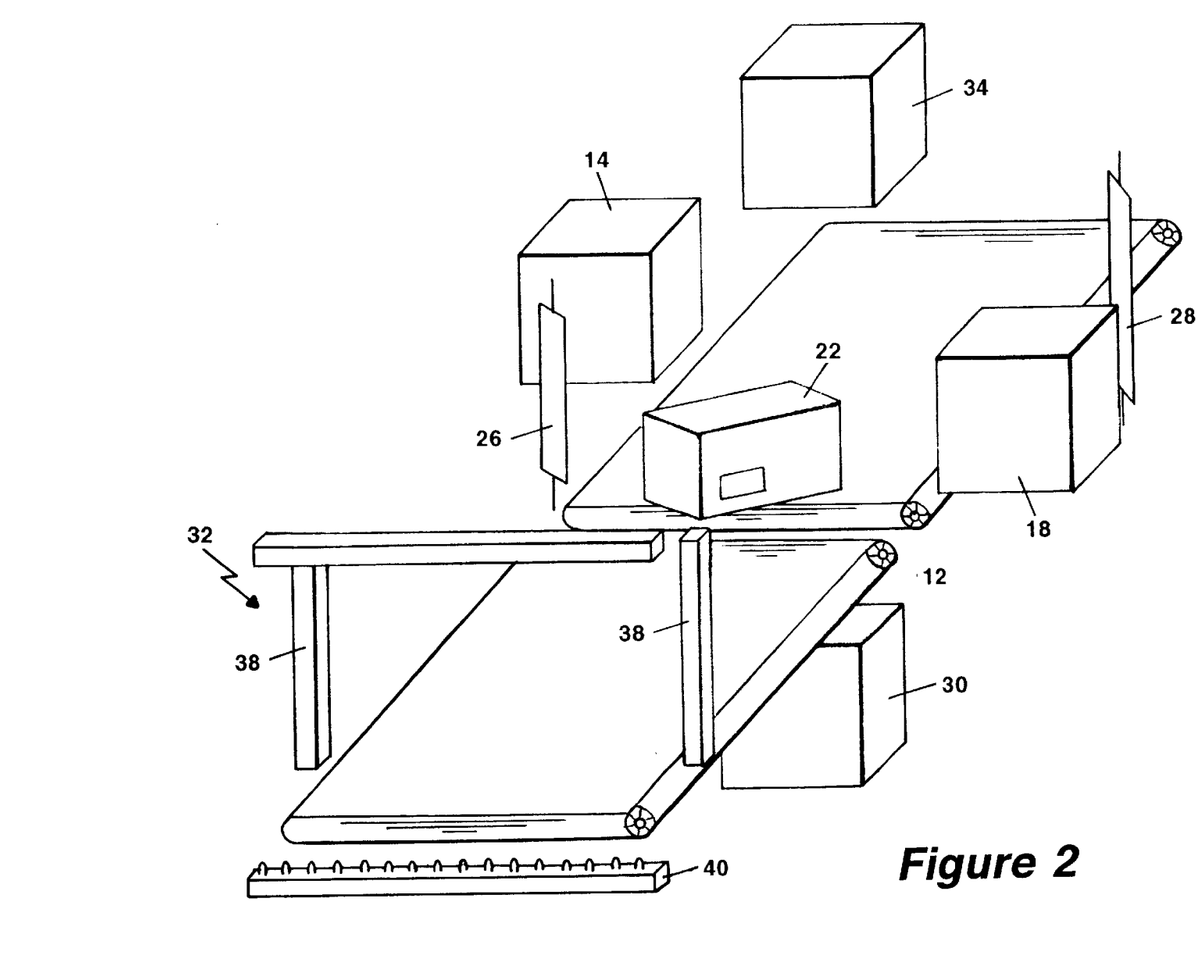
FIG. 2 is a schematic isometric view of invention with servo controlled mirrors for unregistered packages.

FIG. 1 is an isometric view of a machine vision inspection system 10 incorporating therein a conventional conveyor system 12 having cameras 14, 16, 18 and 20 uniquely placed adjacent thereto in accordance with a preferred embodiment of the invention. Cameras 16 and 20 perform one sided scanning and cameras 14 and 18 perform two sided scanning. During operation of the machine vision inspection system 10, a package 22 having an address and other information on its surfaces moves past the plurality of cameras 14, 16, 18 and 20. The cameras image all 6 surfaces of the package 22 (bottom, top and four sides). The surface image data is processed in a conventional processor that determines, from the scanned surface image data, the destination address of the package. In FIG. 2, one mode of the invention, the package can be oriented in any direction, that is, it need not be aligned in a certain way on the conveyor system 12.

Line scan cameras are used presently in such systems. A first priority in a machine vision inspection system is to form a good quality image of the required information as it passes before the camera(s). A conventional line scan camera can be used to obtain accurate information from an item or object passing along in front of the camera, for example, a package on a conveyor belt, under certain circumstances. Line scan camera technology has certain qualities that enables it to overcome the limitations of conventional, frame-based cameras and be successfully applied to surface inspection. A line scan camera has a single array of photo-sensors and uses the motion of the item inside the camera's view to generate a two-dimensional image. Because line scan cameras are based on a single row of photo-elements, line scan cameras generate a continuous, two-dimensional image of a surface as it moves by. The continuous flow of scan lines produced by a line scan camera is known as a video stream. The line scan camera sees only a small portion of the package surface for a short time, and there is no need to shutter or "freeze" the image. Line scan cameras produce images that are significantly different from frame-based cameras. A frame-based camera generates a sequence of discrete video frames, while a line scan camera generates a continuous image that is virtually unbounded in length.

A typical line scan camera has a sensor range from 1024 to over 8192 pixels in length and can produce video data at an aggregate pixel rate of up to 120 million pixels per second. The advantages of the line scan camera for surface inspection are high horizontal resolution using relatively inexpensive equipment, high vertical resolution, and continuous image generation.

A major problem in automatic or machine inspection systems utilizing line scan cameras is the varying depth of focus caused by the motion of the items as they move toward and then away from the cameras. This can be seen from FIGS. 1 and 2. In order to compensate for the varying depth of focus, the present invention incorporates therein a novel use of extended depth of focus technology.

As stated above, applications, such as postal parcel sorting, require cameras that lift images as the object passes by the camera. The images are then used to determine the destination of the parcel, by using optical character recognition software to process the image. The typical device used for this application is an auto-focusing line scan camera that samples one line of the passing surface for every 0.005 inches the object moves past the camera. If the surface that is being imaged maintains a fixed distance from the camera lens, a sharp image will result. However, if the package is skewed on the belt, and a side view is being acquired, then only part of the image will be in focus, unless the camera changes its focal adjustment as the package passes by.

Thus, the present invention provides a "tunnel" configuration where the top and bottom and registered sides can be imaged using conventional camera systems such as line scan cameras in conjunction with extended depth of field cameras. In order to solve the problem associated with objects or packages 22 which are registered on the conveyor system 12 producing leading and trailing surfaces, as well as unregistered or skewed packages in which the side surfaces requiring focusing at various distances as the package 22 passes by a camera, the present invention relies upon the extended depth of field technology.

Such technology, which is used to extend the depth of field of a camera, incorporates a special purpose optical mask within the camera system. The optical mask makes it possible for digital processing to produce an image with in-focus resolution over a large range of misfocus by digitally processing the resulting intermediate image. The optical mask causes the optical transfer function to remain essentially constant within some range away from the in-focus position. The digital processing undoes the optical transfer function modifying effects of the mask, resulting in the high resolution of an in-focus image over an increased depth of field. Generally the mask is placed at a principle plane of the optical system. Preferably, the mask modifies only phase and not amplitude light and is used to increase the useful range of passive ranging systems. An example of an extended depth of field system is described in U.S. Pat. No. 5,748,371, entitled "Extended Depth of Field Optical Systems" wholly incorporated herein by reference.

Figure 3:
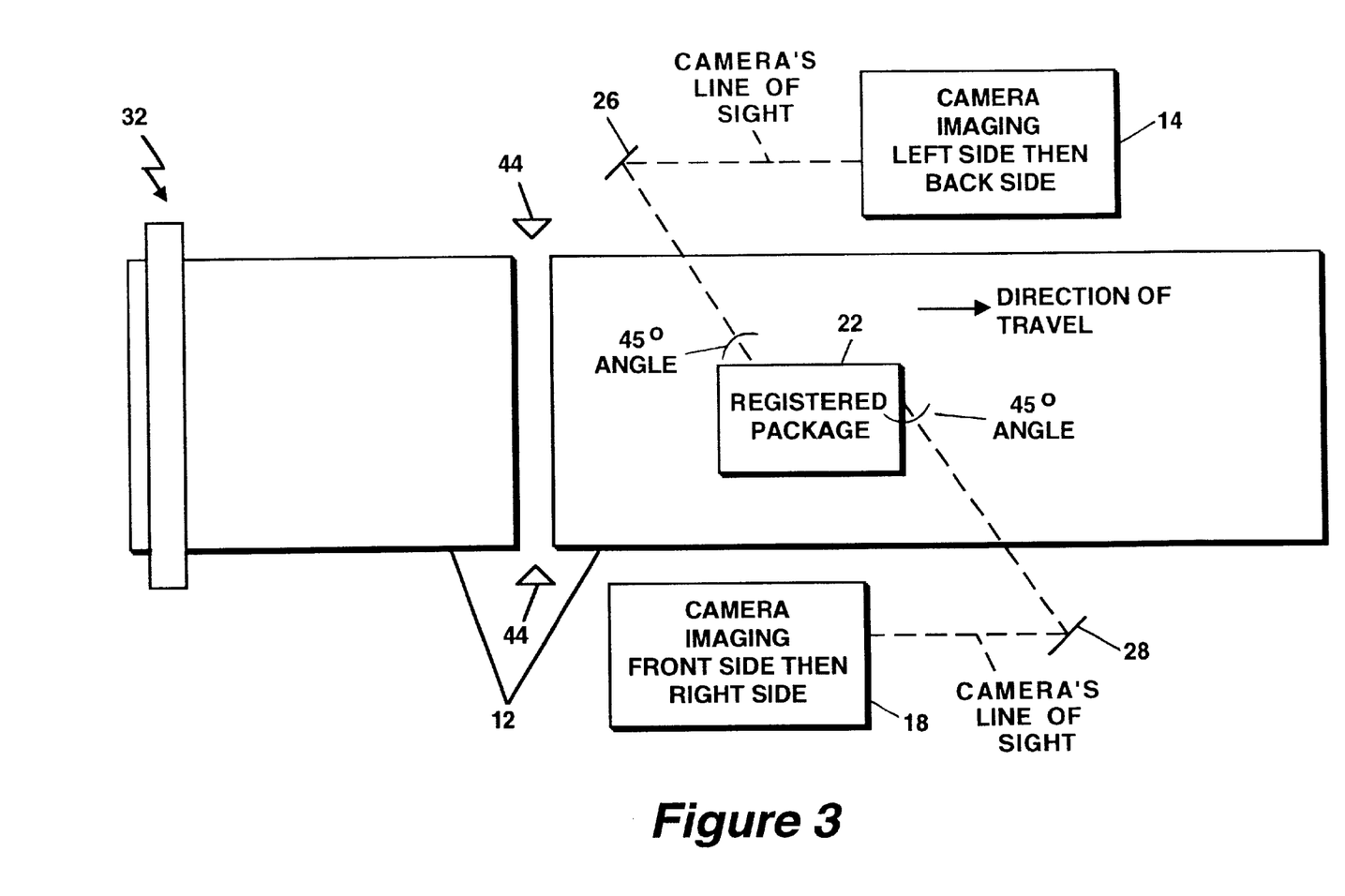
FIG. 3 is a schematic top view of a conveyor system showing a first and a second side camera and a registered package.

FIG. 3 is a schematic top view of a conveyor system showing a first and a second side camera or scanner 14 and 18, respectively, arranged according to the present invention, and the conveyor system 12 conveying a registered package 22. A first side camera 14 images the left side of the package 22 and then the back side of the package 22. A second side camera 18 images the front side of the package 22 and then the right side of the package 22.

The extended depth of field imaging system is used in an image lift tunnel scanner capable of simultaneously focusing on objects of different heights. A typical optical system, in inspection applications, has a limited depth of focus of about +/−1 inch, and must adjust its focus to view objects of more widely varying heights separately. The extended depth of field imaging system is capable of simultaneously viewing packages that have as much as a 30 inch height differential. The application places a camera above the conveyor belt, where the camera scans a mixed stream of non-singulated packages. Short and tall packages that are side by side are scanned with the same focal quality.

The image lift tunnel scanner operates by passing a package first through a dimensional device, such as a light curtain, 32 (shown in connection with FIG. 2 for use in the skewed mode where the side of package is not aligned with the conveyor) that determines the package's height, width, length, orientation and position on the conveyor belt. A bottom scan camera 30 (as seen in FIG. 2) takes a fixed focus image and requires only trigger (instant the camera should be actuated based on its position along the length of the conveyor 12) and length information (how long the camera should remain activated) from the light curtain 32. The length information determines the duration of the scan after the camera 30 receives the trigger signal from the light curtain 32. The light curtain 32 includes a light curtain for height 38 and a light curtain for width, position and orientation 40.

A top scan camera 34 (as seen in FIG. 2) also requires a trigger and the length information along with the height information so that it can set its focus. Each of the two side cameras 14, 18 also receives trigger and length information. If the package 22 is registered on the conveyor belt, the only additional information required is the package width and the package position on the conveyor belt so that the start and stop of the image scan can be calculated. The second side camera 18 scans the front of the package as the package approaches the camera.

Figure 7A:
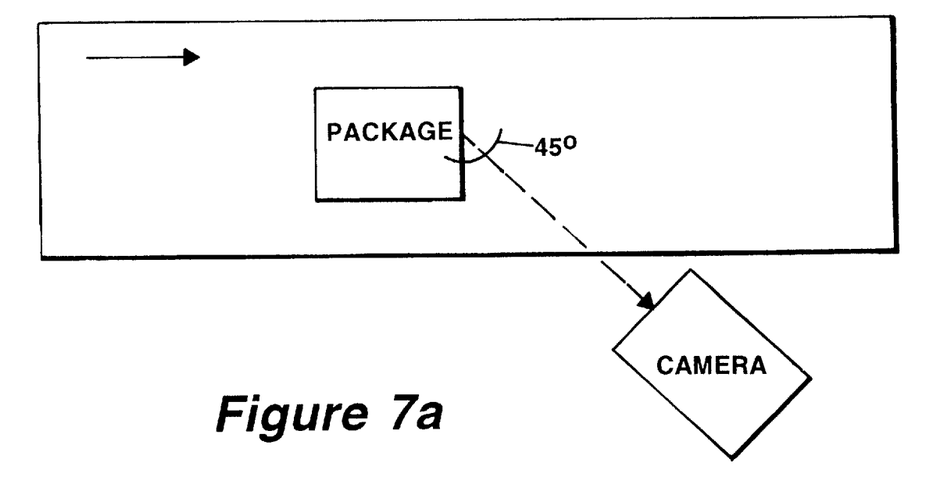
FIGS. 7a and 7b are schematic views showing the 45 degree optimum camera angle between a camera in the system of the present invention and a side of a package on the conveyor system.
Figure 7B:
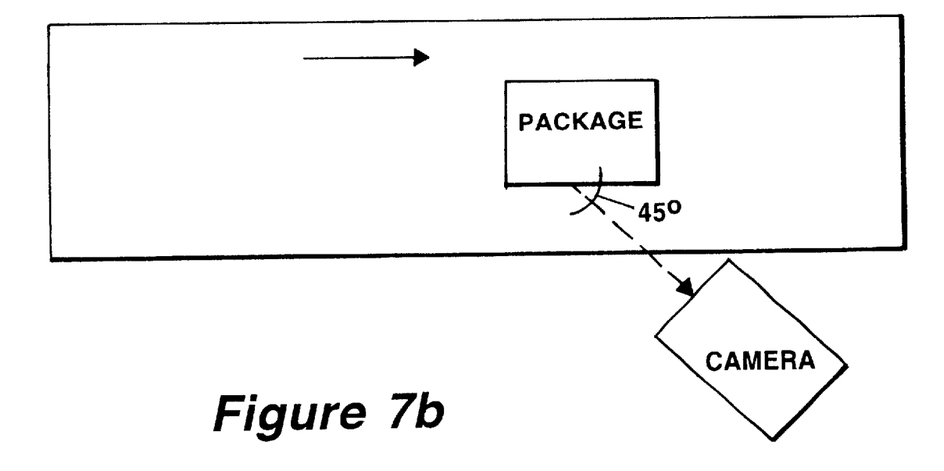

The side camera 14 views the front side of the package at a 45 degree angle as shown in FIG. 7a. After sweeping the front of the package, the scan line of the side camera 14 continues sweeping along the side of the package, again at a 45 degree angle, but shifted 90 degrees relative to the angle at which the front side of the package was scanned, as shown in FIG. 7b. The present invention may use a camera angle other than 45 degrees, for example, any angle between 35 degrees and 55 degrees, however maintaining an optimal 45 degree angle between the camera and the package provides a balanced camera view of the two sides of the package to be viewed.

Due to the extended depth of focus capability, the system has only to track the start and stop times of the scan. The task of tracking the surface in real time and refocusing the system is not necessary. The other camera 18 scans the side of the package and the back of the package as the package moves along the conveyor belt.

Figure 4:
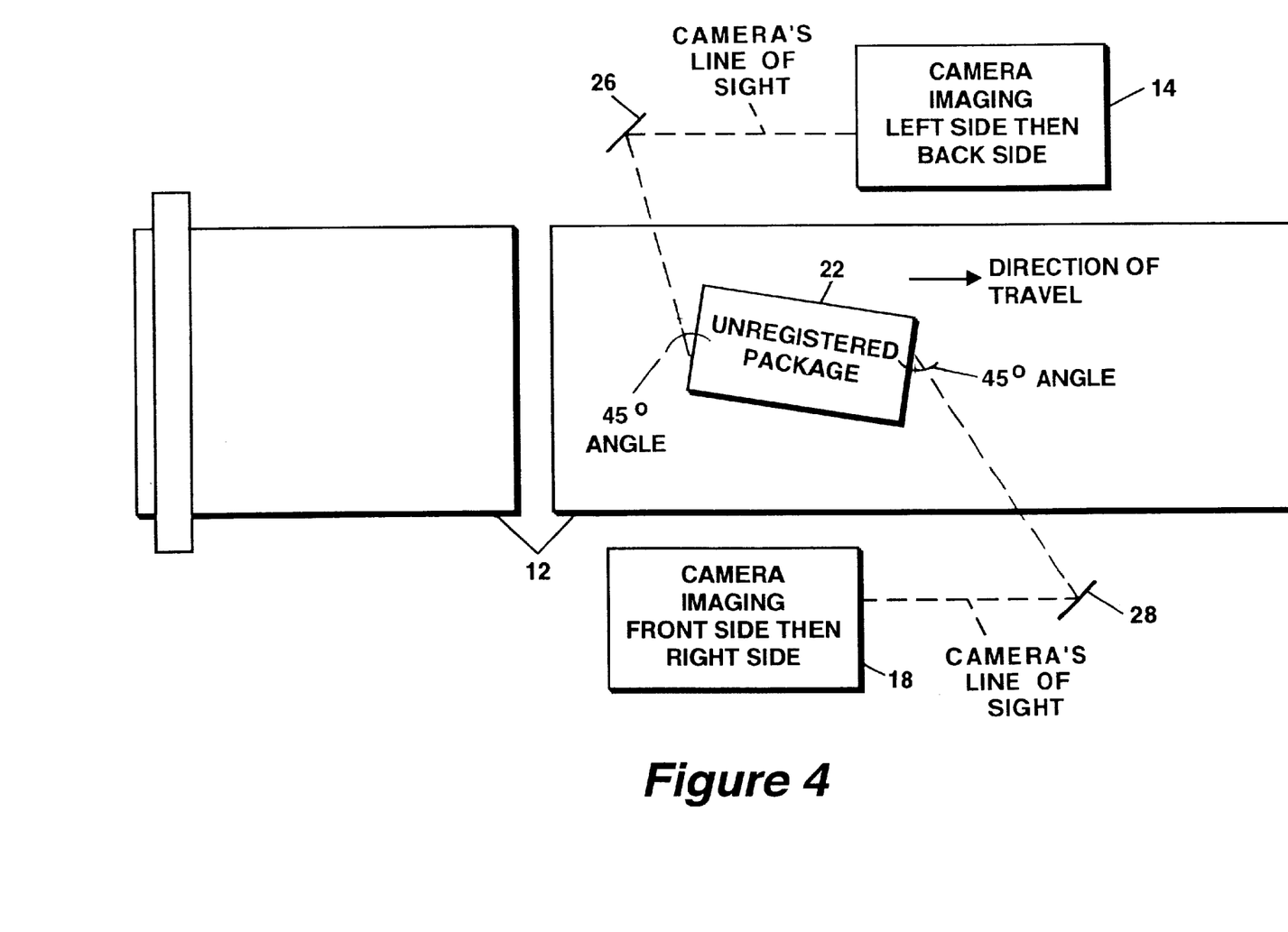
FIG. 4 is a schematic top view of a conveyor system similar to that of FIG. 3 where the conveyor system is conveying an unregistered or skewed package.

FIG. 4 is a schematic top view of the conveyor system of FIG. 3 where the in conveyor system 12 is conveying an unregistered package 22. The first side camera 14 images the left side of the package 22 and then the back side of the package 22. The second side camera 18 images the front side of the package 22 and then the right side of the package 22. The first servo controlled mirror 26 directs the line of sight of the first camera 14 at a 45 degree angle with respect to the side of the unregistered package. The second servo controlled mirror 28 directs the line of sight of the second camera 18 at a 45 degree angle with respect of the second side of the unregistered package 22.

Figure 10:
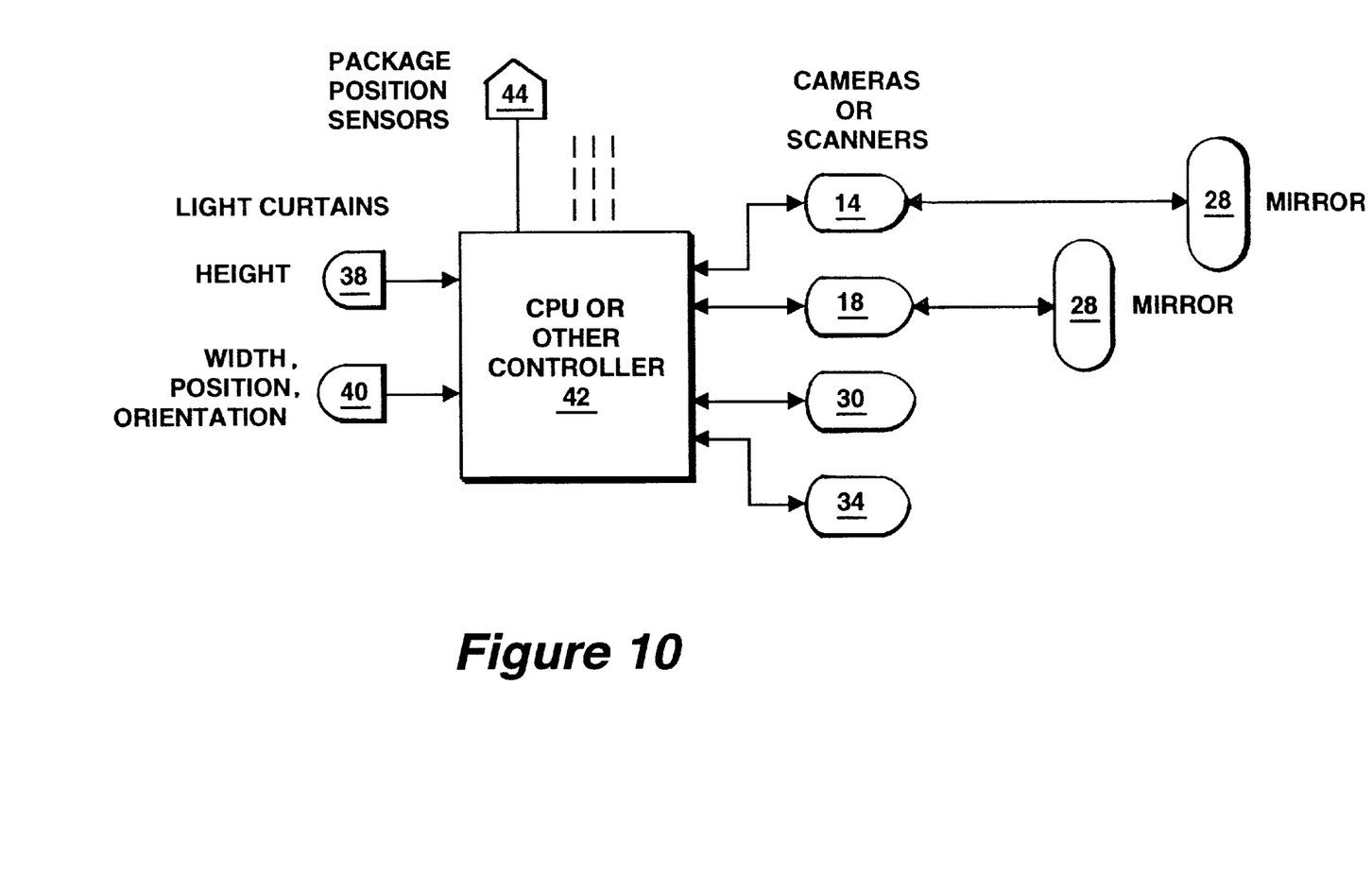
FIG. 10 is a block diagram of the control circuit.

In this second mode of the invention, the package 22 is unregistered (skewed) on the conveyor belt 12. The unregistered package configuration uses a mirror element for each side viewing camera. The mirror 3 servo controlled and moves based upon the package orientation information received from the light curtain system. The servo mirror system maintains, for example, a 45 degree incident scanning angle for each side camera regardless of the package orientation. Each side camera is capable of scanning the front and then a first side of a package or a second side of the package and then the back of the package. The control system, which may be a CPU, 42 must ensure that the two side cameras do not duplicate the scanning of one side while omitting the scan of the opposite side. FIG. 10 is a block diagram of a control system which includes CPU 42, the light curtain for height 38 the light curtain for width, position and orientation 40 camera 14 with its associated mirror 26, camera 18 with its associated mirror 28, camera 30, camera 34 and the package position sensor 44 so that the entire process is properly controlled as described.

Additionally, there is an optimal orientation range for each side camera. Only the sides of the package that are angled towards the side of the belt where the camera is located are viewed by that camera. A registered package is considered to have its front side at 90 degrees relative to the side of the conveyor and the right side at 0 degrees relative to the side of the conveyor. Only packages with the front side orientations from 45 degrees will have the front side imaged by the camera on the first side. Otherwise, when the front side is oriented at more than 45 degrees, it becomes the side of the package and the camera on the second side will capture the front side image, which is the leading surface of the package, and the first camera will captures the back side image, which is the trailing surface of the package.

Figure 5A:
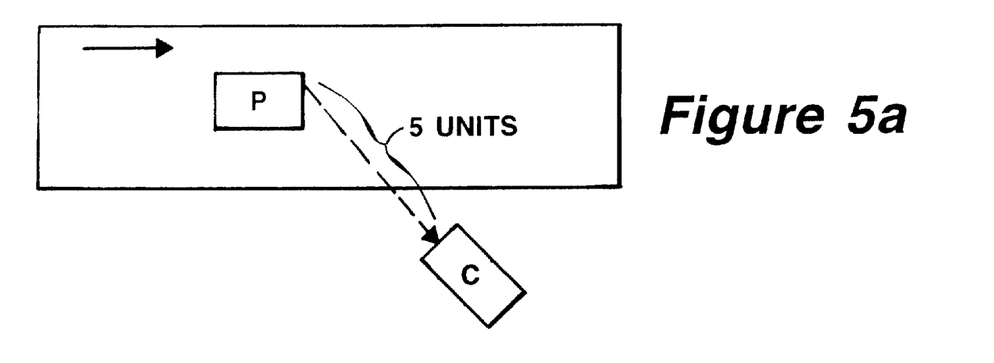
FIGS. 5a, 5b and 5c are schematic views showing changes in camera focal length as a registered package moves along a conveyor system.
Figure 5B:
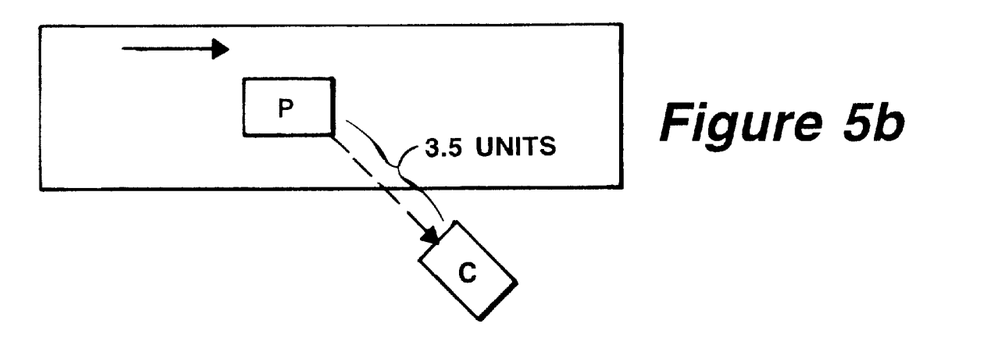
Figure 5C:
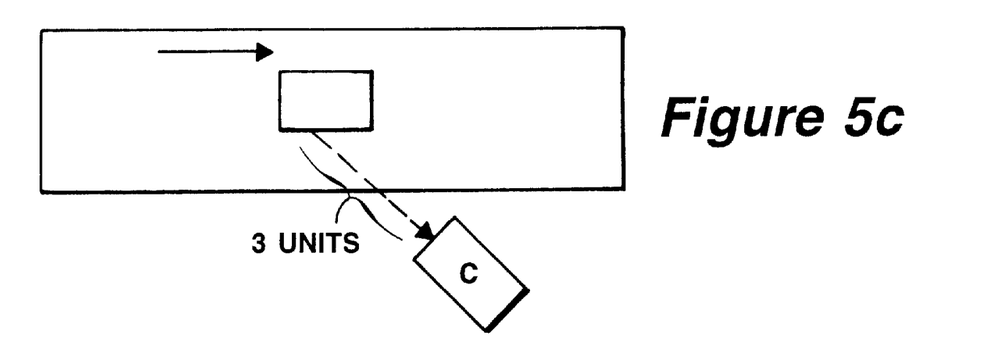

FIGS. 5a, 5b and 5c are line drawings showing changes in camera focal length as a registered package moves along a conveyor system. In FIG. 5a, the camera is scanning the front of the package and the focal length of the camera is for example 5 units. In FIG. 5b, the camera is scanning the near front-end of the package and the focal length of the camera is 3.5 units. In FIG. 5c, the camera is scanning the side of the package and the camera focal length remains at 3 units.

Figure 6A:
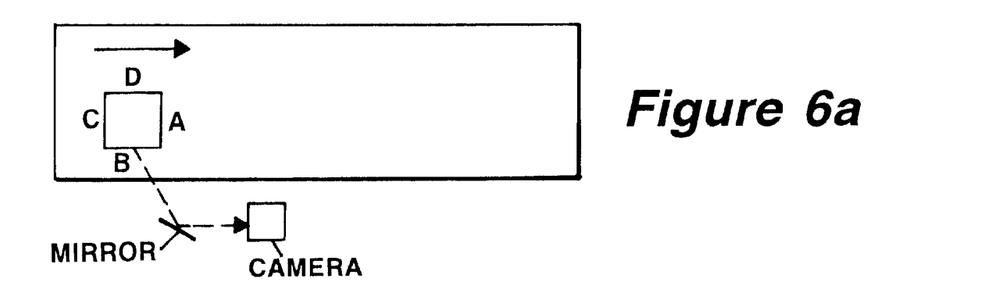
FIGS. 6a, 6b and 6c are schematic views showing the different orientations for a package on the conveyor.
Figure 6B:
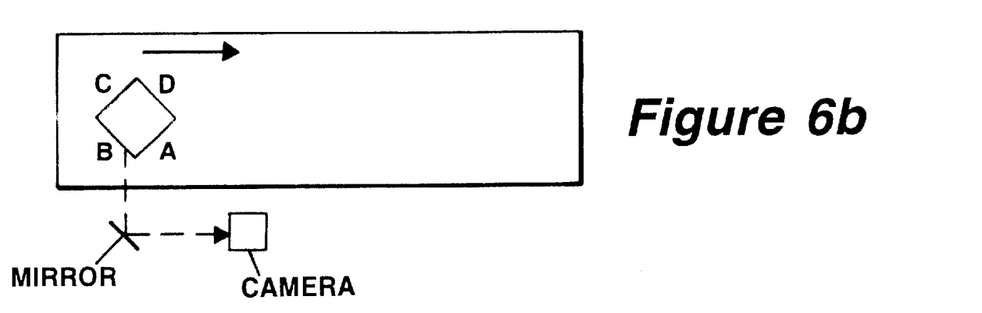
Figure 6C:
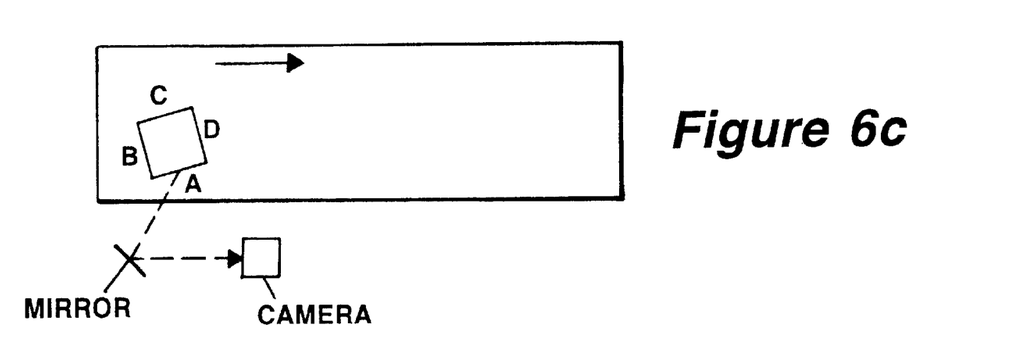

FIGS. 6a, 6b and 6c are line drawings showing different package orientations. In FIG. 6a side "A" is the front side or leading surface of the parcels. The camera reads sides A–B. In FIG. 6b, sides "A"and "D"are both leading surfaces. The camera reads only sides A–B. In FIG. 6c, side "D" is now the leading surface and side "A" is a side surface. The camera reads sides A–B.

A single camera can simultaneously focus on near objects at separation of up to 36 inches with a stand off of only 18 inches. A line scan camera can be used for the top and bottom surfaces of a box that are flat and parallel to the conveyor belt, using known techniques to acquire images of acceptable OCR quality. If the box is oriented skewed then acceptable images can also be acquired from the two sides of a box. However, acquiring an OCR quality image from the front and the back of the box, as it passes by on a conveyor belt, requires a real time variable focus mechanism. The extended depth of field camera performs this real time task without the need for package surface sensing feed back loops, without servo focusing mechanisms, without precise package orientation and it tolerant of irregular and sloped surfaces.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A scanner inspection conveying system, comprising:
   a. a conveyor for moving articles along a longitudinal path to pass at least two viewing positions;
   b. a first scanner having an extended depth of field imaging system located at a first viewing position on one side of said conveyor for scanning the side and front or rear of an article;
   c. a second scanner having an extended depth of field imaging system located at a second viewing position located on the other side of said conveyor from said first scanner and downstream therefrom, for scanning the other side and rear or front of an article as it moves along the longitudinal path whereby all sides of an article on the conveyor are scanned by the first and second scanner.

2. A system as defined in claim 1 wherein said scanners are image lift tunnel scanners.

3. A system as defined in claim 1 further comprising a dimensioning device disposed upstream of the first scanner for determining an article's height, width, length orientation and position on the conveyor and providing at least position and length information to the scanners so that the scanners will know when to begin actuation and the duration of the scan.

4. A scanner inspection conveying system, comprising:
   a. a conveyor for moving articles along a longitudinal path to pass at least two viewing positions;
   b. a first scanner having an extended depth of field imaging system located at a first viewing position on one side of said conveyor for scanning the side and front or rear of an article;
   c. a second scanner having an extended depth of field imaging system located at a second viewing position located on the other side of said conveyor from said first scanner and downstream therefrom, for scanning the other side and rear or front of an article as it moves along the longitudinal path whereby all sides of an article on the conveyor are scanned by the first and second scanner; and
   d. a light curtain device disposed upstream of said first scanner for determining an article's height, width, length, orientation and position on the conveyor and providing at least position and length information to said scanners so that the scanners will know when to begin actuation and the duration of the scan.

5. A system as defined in claim 4, further comprising a bottom scan camera for taking a fixed focus image and obtaining position and length information from the dimensioning device so the bottom scan camera will know when to begin actuation and the duration thereof.

6. A system as defined in claim 4, further comprising a top scan camera for taking a fixed focus image and obtaining position and length and height information from the dimensioning device so that the top scan camera can set its focus and know when to begin actuation and the duration thereof.

7. A system as defined in claim 4, further comprising a mirror assembly for each scanner, said mirror assembly including a mirror and a servo mechanism for moving said mirror in response to information received from said light curtain device to provide the scanner with which it is associated with a 45 degree incident scanning angle for an article being scanned.

8. A system as defined in claim 7, further comprising a control system to assure that each scanner scans two different sides of the article than the other scanner.

9. A system as defined in claim 8, wherein the control system is constructed and arranged so that for a skewed article, only the sides of the article that are angled towards the side of the conveyor where the scanner is located are scanned by that scanner.

* * * * *

UNITED STATES PATENT AND TRADEMARK OFFICE
CERTIFICATE OF CORRECTION

PATENT NO. : 6,484,066 B1
DATED : November 19, 2002
INVENTOR(S) : Michael J. Riess and Lawrence E. Albertelli It is certified that error appears in the above-identified patent and that said Letters Patent is hereby corrected as shown below:

Column 8,
Line 59, add -- and -- following the semicolon

Column 9,
Line 26, "light curtain" should read -- dimensioning --

Column 10,
Lines 16 and 17, "light curtain" should read -- dimensioning --

Signed and Sealed this

Fourth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,484,066 B1
DATED : November 19, 2002
INVENTOR(S) : Michael J. Reiss and Lawrence E. Albertelli It is certified that error appears in the above-identified patent and that said Letters Patent is hereby corrected as shown below:

<u>Title page, Item [54] and Column 1, line 1,</u>
Please replace the word "LIFE" with the word -- LIFT --.

Signed and Sealed this

Sixth Day of May, 2003

JAMES E. ROGAN
*Director of the United States Patent and Trademark Office*